United States Patent [19]
Fukui

[11] Patent Number: 6,040,350
[45] Date of Patent: Mar. 21, 2000

[54] EPOXY RESIN TYPE COMPOSITION FOR STIFFENING VEHICLE BODY AND METHOD FOR STIFFENING VEHICLE BODY

[75] Inventor: Takayuki Fukui, Kanagawa-ken, Japan

[73] Assignee: Nissan Motor Co., Ltd., Kanagawa-ken, Japan

[21] Appl. No.: 09/140,314

[22] Filed: Aug. 26, 1998

[30] Foreign Application Priority Data

Aug. 26, 1997 [JP] Japan .................................. 9-229865

[51] Int. Cl.⁷ ...................................................... C08L 63/00
[52] U.S. Cl. ............................................................. 521/135
[58] Field of Search ............................................. 521/135

[56] References Cited

U.S. PATENT DOCUMENTS

| | | | | |
|---|---|---|---|---|
| 5,401,783 | 3/1995 | Bowen | ..................... | 523/116 |
| 5,708,039 | 1/1998 | Daly | ......................... | 521/61 |
| 5,851,311 | 12/1998 | Diamant | ..................... | 148/23 |

FOREIGN PATENT DOCUMENTS 48-2631  1/1973  Japan .

*Primary Examiner*—Paul R. Michl
*Attorney, Agent, or Firm*—McDermott, Will & Emery

[57] ABSTRACT

Disclosed is an epoxy resin type composition for stiffening a vehicle body. The epoxy resin type composition comprises an epoxy resin, a powdery methacrylate type polymer in an amount of 2 to 45 parts by weight relative to 100 parts by weight of the epoxy resin, a thermally active hardening agent for epoxy resin in an amount of 1 to 20 parts by weight relative to 100 parts by weight of the epoxy resin, a thermally decomposable foaming agent in an amount of 0.5 to 20 parts by weight relative to 100 parts by weight of the epoxy resin, and a mixture of an inorganic salt with a shape of a predetermined aspect ratio and a granular inorganic salt in an amount of 50 to 200 parts by weight relative to 100 parts by weight of the epoxy resin. A mixing ratio of the granular inorganic salt is 0 to 50% by weight relative to the total amount of the mixture. Also disclosed is a method for stiffening a vehicle body by use of such a composition.

18 Claims, 5 Drawing Sheets

FIG.3

| | | | EXAMPLE 1 | EXAMPLE 2 | EXAMPLE 3 | EXAMPLE 4 | EXAMPLE 5 | EXAMPLE 6 | EXAMPLE 7 | EXAMPLE 8 | EXAMPLE 9 |
|---|---|---|---|---|---|---|---|---|---|---|---|
| BLENDING (PARTS BY WEIGHT) | EPOXY RESIN | BISPHENOL A TYPE (n=1.2) | 100 | 100 | 100 | 100 | 100 | 100 | 100 | 100 | 100 |
| | METHACRYLATE RESIN | PMMA (Tg=95°C) | 5 | 40 | 30 | 30 | 30 | 30 | 30 | 30 | 30 |
| | HARDENING AGENT | DICY (REACTION AT 150°C) | 6 | 6 | 3 | 15 | 6 | 6 | 6 | 6 | 6 |
| | FOAMING AGENT | OBSH (DECOMPOSITION AT 150°C) | 6 | 6 | 6 | 6 | 1 | 15 | 6 | 6 | 6 |
| | INORGANIC FILLER | CALCIUM SILICATE (ASPECT RATIO =3:1) | 130 | 130 | 130 | 130 | 130 | 130 | 50 | 180 | 70 |
| | | CALCIUM CARBONATE (GRANULAR) | | | | | | | | | 60 |
| EVALUATION | FOAMING MAGNIFICATION | | 2.4 | 2.2 | 2.2 | 2.1 | 2.0 | 2.3 | 3.2 | 2.8 | 2.4 |
| | FOAMING HOMOGENEITY | | OK | OK | OK | OK | OK | OK | OK | OK | OK |
| | RIGIDITY TEST | | OK | OK | OK | OK | OK | OK | OK | OK | OK |
| | STORAGE STABILITY | | OK | OK | OK | OK | OK | OK | OK | OK | OK |
| | STEEL PLATE NON-CONTACT PROPERTIES | | OK | OK | OK | OK | OK | OK | OK | OK | OK |

FIG.4

| | | COMPARATIVE EXAMPLE 1 | COMPARATIVE EXAMPLE 2 | COMPARATIVE EXAMPLE 3 | COMPARATIVE EXAMPLE 4 | COMPARATIVE EXAMPLE 5 | COMPARATIVE EXAMPLE 6 | COMPARATIVE EXAMPLE 7 | COMPARATIVE EXAMPLE 8 | COMPARATIVE EXAMPLE 9 |
|---|---|---|---|---|---|---|---|---|---|---|
| EPOXY RESIN | BISPHENOL A TYPE (n=1.2) | 100 | 100 | 100 | 100 | 100 | 100 | 100 | 100 | 100 |
| METHACRYLATE RESIN | PMMA (Tg=95°C) | 1 | 50 | 30 | 30 | 30 | 30 | 30 | 30 | 30 |
| HARDENING AGENT | DICY (REACTION AT 150°C) | 6 | 6 | 0.5 | 25 | 6 | 6 | 6 | 6 | 6 |
| FOAMING AGENT | OBSH (DECOMPOSITION AT 150°C) | 6 | 6 | 6 | 6 | 0.1 | 25 | 6 | 6 | 6 |
| INORGANIC FILLER | CALCIUM SILICATE (ASPECT RATIO =3:1) | 130 | 130 | 130 | 130 | 130 | 130 | 30 | 250 | 30 |
| | CALCIUM CARBONATE (GRANULAR) | / | / | / | / | / | / | / | / | 100 |
| FOAMING MAGNIFICATION | | 3.5 | 1.0 | 3.6 | 2.2 | 1.0 | 2.2 | 3.8 | 1.2 | 3.2 |
| FOAMING HOMOGENEITY | | NG | OK | NG | NG | NG | OK | NG | NG | NG |
| RIGIDITY TEST | | OK | / | / | OK | OK | OK | OK | NG | OK |
| STORAGE STABILITY | | OK | OK | OK | OK | OK | OK | OK | OK | OK |
| STEEL PLATE NON-CONTACT PROPERTIES | | NG | OK | OK | OK | OK | OK | NG | OK | OK |
| | | BLENDING (PARTS BY WEIGHT) | | | | | EVALUATION | | | |

EPOXY RESIN TYPE COMPOSITION FOR STIFFENING VEHICLE BODY AND METHOD FOR STIFFENING VEHICLE BODY

The contents of Priority Application No. TOKUGAN-HEI 9-229865, with a filing date of Aug. 26, 1997 in Japan, are hereby incorporated by reference.

BACKGROUND OF THE INVENTION

1. Field of the Invention

The present invention relates to an epoxy resin type composition for stiffening a vehicle body and a method for stiffening a vehicle body, and, in particular, to an epoxy resin type composition for stiffening a vehicle body for improving a rigidity of a box type structural member with a closed section constituting a part of a vehicle body and a method for stiffening a vehicle body by use of the same.

2. Description of the Related Art

Although a conventional vehicle body skeleton having a box type structural member with a closed section is produced by giving various sectional shapes to such a closed sectional structure, there is demand for reduction of its body weight from social demand for reduction of mileage from a viewpoint of the tendency of exhausting fossil fuels and for reduction of exhaust gas from a viewpoint of air and environmental protection.

Meanwhile, a vehicle body is stiffened due to demand for noise and vibration performance, safety in collision and safety for vehicle driving control, whereas there is the tendency that the body weight of a vehicle is increasing year by year. The method for stiffening a vehicle body generally uses a metallic stiffening material in a portion or portions considered effective for the vehicle body. On the other hand, a body structure of a vehicle whose body skeleton is stiffened by charging a foamed body of a hard urethane resin into the inside of a closed section of the vehicle body skeleton is well-known.

Charging of this foamed body exerts, a high inhibitory effect on buckling of the wall of the box type structural member of the vehicle body skeleton to significantly increase the rigidity of the box type structural member. Accordingly, as compared with the method for stiffening the vehicle body by metallic stiffening materials, there is the advantage that rigidity can be improved without significantly increasing the body weight.

Besides the urethane resin, resin foaming type fillers used in such foamed body charging include olefin resin type foaming fillers (Nippon Shihka, trade name: Shihka Lastmer 240), epoxy resin type foaming fillers (Iida Sangyo, trade name: OROTEX 815) etc., and any of these fillers are charged by being foamed in the step of coating line of a vehicle body.

However, in the method for stiffening the vehicle body by the foamed body of the urethane resin, there occurs considerable leakage of the urethane resin through small holes in the box type structural member and the portions of the box type structural member to be attached to each other, at the time of introduction of a stock solution of the urethane resin into the box type structural member of the vehicle body, or at the time of foaming in the step of the coating line of the vehicle body. Accordingly, measures to prevent such leakage should be taken, so it is considered difficult to apply this method to an actual mass-production line for vehicles.

Further, the foaming step of the actual mass-production line use in recent years is the step of using water in place of the step of using Freon from a viewpoint of improvement of working environments. However, it is difficult to achieve foaming homogeneity by the foaming step of using the water as compared with the foaming step of using the Freon.

Furthermore, it is a difficult operation for workers to introduce with an injection machine the stock solution of the urethane resin into vehicle bodies carried by a conveyer in a process of producing vehicles.

In addition, low-molecular-weight polyethylene wax etc. are used in an olefin resin as base in the olefin resin type foaming fillers. Accordingly, the rigidity of the material is not sufficient, and even charged into a box type structural member, its effect of improving rigidity is not sufficient.

With respect to epoxy resin type foaming fillers, it should be taken into consideration that their toughness is insufficient. This is because the input of loading onto a vehicle body is not necessarily static and the running vehicle body will undergo dynamic loading or even impact loading in some cases on a bumpy road, so impact resistance durable to such dynamic loading and impact loading, that is, toughness is required.

The method for improving this impact resistance is divided roughly into a method of improving the chemical structure itself of the epoxy resin and a method of adding a separately prepared impact-resistant improver to the epoxy rein. However, an epoxy resin satisfying impact resistance sufficiently has never been attained by using only the former method. On the other hand, the latter method includes the following conventional methods: (a) a method of adding a soluble elastomer monomer to a green epoxy resin and polymerizing them, (b) a method of adding a compatible elastomer polymer to a green epoxy resin, and (c) a method of dispersing an impact resistance-improving polymer in a green epoxy resin, etc.

Among these, the above method (a) is known as giving IPN (Inter-Penetrating Network). However, this prior method has the problem that along with reduction in the softening point of its product, its mechanical properties are not constant. For the above method (b), there are many proposals on rubber modification by adding elastomer components such as butadiene-acrylonitrile copolymer rubber (CTBN or ATBN) having a carboxyl group or amino group at the terminals, and some proposals are put to practical use. However, it cannot be said that the product obtained in this method is completely satisfactory in respect of impact resistance and toughness for use in stiffening a vehicle body to improve its rigidity. Further, in the above method (c), many resistance impact improvers including polyamide type resin have been proposed, but there is a problem with compatibility with the epoxy resin, and it is also difficult to regulate its viscosity at the time of foaming. Further, if a polymer with low glass transition temperature is mixed, storage stability may be deteriorated.

More specifically, if the viscosity of the resin used as foaming fillers is rapidly decreased in a foaming temperature range, generated gas is difficult to maintain in the resin, so foaming state is broken, thus making formation of its foamed body difficult. That is, it is necessary to regulate temperature dependency of resin viscosity in the foaming temperature range in order that so-called foamed cells are stably present in the resulting foamed body. For this, elastomer etc. with high compatibility with the epoxy resin are added to regulate the temperature dependency of viscosity or to regulate the temperature dependency of viscosity by cross-linkage.

However, the rigidity inherent in the epoxy composition will be lowered upon regulation of viscosity by adding the elastomer. Alternatively, if the viscosity is regulated by the cross-linkage accompanying chemical reaction, its cross-linkage density is subject to the reaction conditions and cannot be strictly regulated. Accordingly, there is the possibility that the viscosity is so high that the foaming is insufficient and the product cannot be sufficiently filled in a box type structural member of a vehicle body.

In addition, the above-described conventional foaming fillers are generally formed into a sheet, which, by use of its adhesion or by providing an adhesive layer, adheres to a constituent panel of the box type structural member. Thereafter, the vehicle body is assembled and passed through a chamber of an electrodeposition such as electrostatic coating in many cases. In such attachment of the sheet to the vehicle body, however, the electrodeposition coating can not cover the surface to which the sheet of the foaming fillers was attached. For example, if such a sheet is attached to a vertical panel of the box type structural member, the sheet is moved downward at the time of baking of the electrodeposition coating, and the raw surface of the constituent panel of the box type structural member is exposed, so there may be the possibility that anti-corrosive performance is lowered.

SUMMARY OF THE INVENTION

The object of the present invention is to provide an epoxy resin type composition for stiffening a vehicle body and also a method for stiffening a vehicle body by use of the same, by which a foaming state is surely realized, the resulting foamed body exhibits adequate toughness, and if it is used in a structural member of a vehicle body, the structural member can exhibit rigidity having adequate impact resistance and the vehicle body is effectively stiffened without significantly increasing the weight of the vehicle body, and simultaneously the anti-corrosive performance of the vehicle body is not deteriorated, and applicability to a mass-production line for assembly of vehicle bodies can be adequately assured.

That is, the epoxy resin type composition for f a vehicle body according to the present invention comprises epoxy resin, a powdery methacrylate type polymer in an amount of 2 to 45 parts by weight relative to 100 parts by weight of the epoxy resin, a thermally active hardening agent for epoxy resin in an amount of 1 to 20 parts by weight relative to 100 parts by weight of the epoxy-resin, a thermally decomposable organic type foaming agent in an amount of 0.5 to 20 parts by weight relative to 100 parts by weight of the epoxy resin, and a mixture of an inorganic salt with a shape of a predetermined aspect ratio and a granular inorganic salt. Here the mixture acts as inorganic fillers and is an amount of 50 to 200 parts by weight relative to 100 parts by weight of the epoxy resin and its mixing ratio of the granular inorganic salt is 0 to 50% by weight relative to the total amount of the mixture as the inorganic fillers.

The epoxy resin type composition for stiffening a vehicle body realizes its foaming state surely, and the resulting foamed body exhibits adequate toughness.

In the case where it is used as a stiffening agent for a structural member of a vehicle body, the structural member can exhibit rigidity having adequate impact resistance so that the vehicle body is effectively stiffened without significantly increasing the body weight. Further, the anti-corrosive performance of the vehicle body is not deteriorated, and applicability to mass-production line for assembly of vehicle bodies can be adequately assured.

The above-described epoxy resin is a bisphenol type epoxy resin represented by the following chemical formula (I):

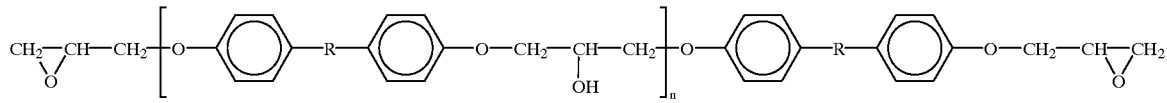

Examples of R groups in the formula (I) include, but are not limited to, —C($C_2H_5$)$_2$, —C($CH_3$)$_2$, —$CH_2$, $CF_2$ etc. and can be suitably selected depending on object, utilities etc.

"n" in the formula (I) refers to a number of 0 or more, and the resin with an "n" value of 1.0 or more on average is solid at normal temperature and is formed into a tube which is preferably attached through a bracket etc. to the inside of a box structural member of a vehicle body.

As the bisphenol chain moiety of this chemical formula (I), a chain of mixed bisphenol A unit and bisphenol F unit can also be preferably used.

Then, the above-described powdery methacrylate type copolymer is produced by emulsion polymerization, and its diameter is in the range of 0.1 to 5.0 μm, preferably.

A methacrylate type monomer used as a starting component of the polymerization includes methacrylates having a C1 to C4 alkyl group, such as methyl methacrylate, and these may be used solely or in combination thereof, among which methyl methacrylate is particularly preferable.

Other copolymerizable monomers can also be used. The other copolymerizable monomers include e.g. aromatic vinyl compounds such as styrene, vinyl toluene, α-methylstyrene etc., vinyl cyanide type compounds such as acrylonitrile, methacrylonitrile etc., and vinylidene cyanide, 2-hydroxyethyl acrylate, 2-hydroxyethyl methacrylate, 3-hydroxybutyl acrylate, 2-hydroxyethyl fumarate, hydroxybutyl vinyl ether, monobutyl maleate, glycidyl ethacrylate, butoxyethyl methacrylate etc. These may be used solely or in combination thereof. The amount of such monomers used is selected in the range of not more than 50% by weight relative to the total weight of the monomers.

The glass transition temperature Tg of the powdery methacrylate type polymer is preferably 70° C. or more. A reason for this is that if a polymer with a glass transition temperature of less than 70° C. is mixed with epoxy resin, storage stability tends to be insufficient. Another reason is to prevent occurrence of a partial cross-linkage because if there is a cross-linkage structure, viscosity at the time of heating is increased to make sufficient foaming impossible.

In addition, the amount of the powdery methacrylate type copolymer incorporated is usually 2 to 45 parts by weight relative to 100 parts by weight of epoxy resin. This is because if the amount is less than 2 parts by weight, the effect of adding the methacrylate type polymer is decreased, while in an amount exceeding 45 parts by weight, viscosity at the time of melting is increased significantly so that an-excellent foam cannot be obtained.

The above-mentioned hardening agent for epoxy resin include e.g. dicyandiamide, 4,4'-diaminodiphenyl sulfone etc., imidazole derivatives such as 2-n-heptadecylimidazole etc., dihydrazide isophthalate, N,N-dialkyl urea derivatives, N,N-dialkyl thiourea derivatives, acid anhydrides such as tetrahydrophthalic anhydride, isophorone diamine, m-phenylenediamine, N-aminoethyl piperazine, melamine, guanamine, boron trifluoride complex, tris(dimethylaminomethyl)phenol etc. These may be used singly or in combination thereof, among which dicyandiamide is particularly preferable.

In the case using the above-mentioned hardening agent, the temperature for initiating hardening reaction is preferably 140° C. or more for sufficient hardening in the step of coating the vehicle body.

The amount of the incorporated thermally active hardening agent for epoxy resin is usually 1 to 20 parts by weight relative to 100 parts of the epoxy resin. This is because if the amount of the incorporated hardening agent is less than 1 part by weight, sufficient hardening does not occur to bring about a reduction of rigidity, whereas in an amount of more than 20 parts by weight, partial decomposition or thermal deterioration is caused at the time of hardening accompanying excess exothermal reaction, resulting in significant deterioration of the mechanical properties of the composition.

The thermally decomposable organic type foaming agent includes azo compounds such as azodicarbonamide, azobisisobutyronitrile etc., nitroso compounds such as dinitrosopentamethylenetetramine, and hydrazide compounds such as p-toluenesulfonyl hydrazide, 4,4'-oxybenzenesulfonyl hydrazide etc.

If the thermally decomposable organic type foaming agent is used, it is possible to use, as a foaming assistant, a mixture of at least one member selected from inorganic salts such as zinc white, zinc nitrate, lead phthalate, tribasic lead phosphate and tribasic lead sulfate, metal soaps such as zinc fatty acid soap, lead fatty acid soap, cadmium fatty acid soap etc., and acids such as boric acid, oxalic acid, succinic acid, adipic acid etc., urea, biurea, ethanolamine, glycol, glycerin etc.

In the above case using the thermally decomposable organic type foaming agent, the temperature for initiating thermal decomposition (gas generation-initiating temperature) is preferably 140° C. or more for sufficient foaming in the step of coating vehicle body.

The amount of the thermally decomposable organic type foaming agent incorporated is usually 0.5 to 20 parts by weight relative to 100 parts of the epoxy resin. This is because if its amount is less than 0.5 part by weight, foaming is inadequate, while in an amount of more than 20 parts by weight, foaming magnification does not change significantly, so there is no economical advantage.

The above inorganic fillers include inorganic salts with a predetermined aspect ratio or a mixture of an inorganic salt having such a predetermined aspect ratio and a granular inorganic salt. Inorganic salts with such a predetermined aspect ratio include e.g. calcium silicate, mica, whisker etc. The granular inorganic salts include talk, clay, aluminum hydroxide, glass beads, calcium carbonate etc. In particular, the inorganic salts with such a predetermined aspect ratio is preferably calcium silicate, and the granular inorganic salt is preferably calcium carbonate. The aspect ratio(longitudinal length:lateral length) is preferably 2:1 or more. This is because at a lower aspect ratio, thixotropic properties are not made sufficient, and hardness at normal temperature and fluidity at the time of heating cannot be attained simultaneously.

The amount of the inorganic fillers incorporated is usually 50 to 200 parts by weight relative to 100 parts by weight of epoxy resin. This is because if the amount of the incorporated fillers is less than 50 parts by weight, the stiffening effect cannot be sufficiently achieved, while in an mount exceeding 200 parts by weight, viscosity is significantly increased, thus making the resulting composition brittle and causing significant deterioration of mechanical properties. Further, the mixing ratio of the inorganic salt having the predetermined aspect ratio and the granular inorganic salt is 0 to 50 parts by weight relative to 100 parts by weight of the mixture of the inorganic salt having the predetermined aspect ratio and the granular inorganic salt. "0 parts by weight" means no addition of the granular inorganic salt. In an amount exceeding 50 parts by weight, the viscosity in the system becomes low and the homogeneity of foamed cells tends to be lost.

The epoxy resin type composition for stiffening a vehicle body according to the present invention can be prepared by incorporating into the above epoxy resin the above methacrylate resin powder, the above thermally active hardening agent, the above thermally decomposable foaming agent, the above inorganic type fillers and necessary additives, followed by mixing thereof homogeneously.

Such additives include e.g. platisizers, diluents, stabilizers, emulsifiers, stiffening agents, coloring agents, anti-oxidants, UV absorbers, lubricants, carbon black etc.

The epoxy resin type composition for stiffening a vehicle body according to the present invention preferably has a penetration rate of 10 or less as determined according to JIS K2207 (100 g weight) at normal temperature. This is because if its penetration rate (with 100 g weight) exceeds 10, there is the danger of deterioration of anti-corrosive performance in cases where if, for example, a foaming material formed from this composition is placed in the inside of a box type structural member of a vehicle body and then left during a long vacation in summer etc., it may be softened due to temperature or moisture so that it is brought into contact with a steel plate panel of the box structural member, and thereafter, even if it is passed through an electrodeposition chamber, an electrodeposition coating such as electrostatic coating does not adhere to the contact face between the foaming material and the steel plate panel to cause deterioration of anti-corrosive performance.

Further, the method for stiffening a vehicle body according to the present invention includes a step for providing a foaming material having been formed into a solid tube or a hollow tube containing the above epoxy resin type composition, a step for arranging step arranging the foaming material in the inside of a box structural member of a vehicle body such that its tubular side is separated from a constitutional panel constituting the box type structural member of the vehicle body, and a step for permitting the foaming material arranged in the box structural member of the vehicle body to be foamed by baking of a coating on the vehicle body to give a foamed body thereby filling the inside of the box structural member of the vehicle body with the foam body.

According to the stiffening method, the box structural member can exhibit rigidity having sufficient impact resistance and the vehicle body can be effectively stiffened without significantly increasing the weight of the vehicle body. Further, there occurs no trouble with the adhesion of a coating paint to the inside of the box structural member of the vehicle body, and applicability to a mass-production line for assembly can be adequately assured.

Here, it is preferable to permit the foaming material to substantially fill the whole of the inside of the box structural member of the vehicle body as the formed body after solidification of a coating paint used in the electrodeposition coating, in order to prevent trouble with adhesion of the coating paint to the inside of the box structural member of the vehicle body.

Such a coating may be an anti-corrosive coating by electrodeposition, and in such a case, there does not occur any trouble with the anti-corrosive coating by electrodeposition onto the inside of the box structural member of the vehicle body. Accordingly, the anti-corrosive characteristics of the vehicle body are not deteriorated.

BRIEF DESCRIPTION OF THE DRAWINGS

FIG. 3 shows evaluation results of epoxy resin type compositions of the present invention.

FIG. 4 shows evaluation results of comparative examples.

DETAILED DESCRIPTION OF THE PREFERRED EMBODIMENTS

Figure 1:
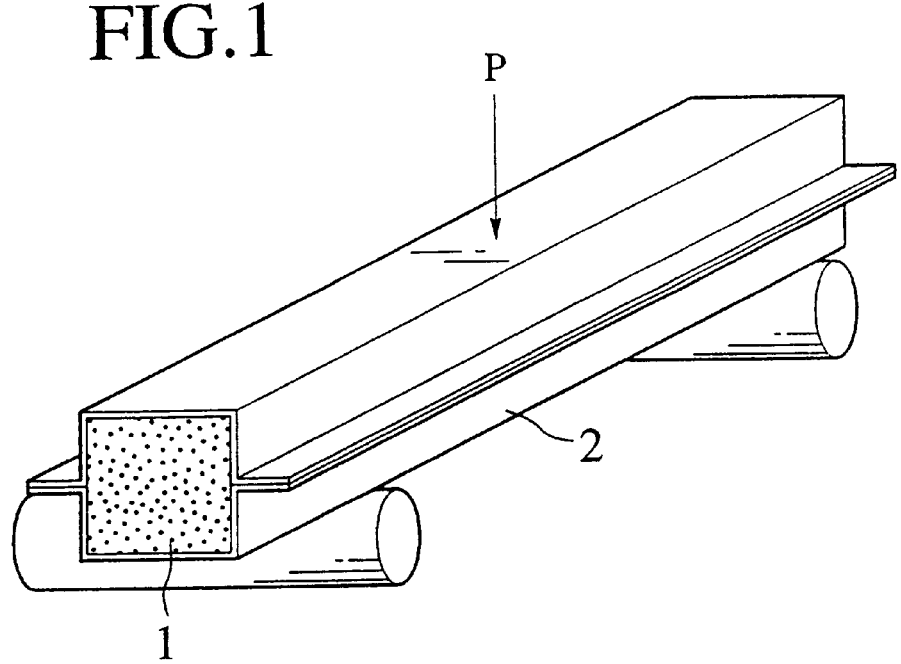
FIG. 1 is a drawing showing a rigidity test of a box structural member charged with a foamed body formed from an epoxy resin type composition of the present invention.

Hereinafter, the embodiments of the present invention are described in detail by suitably referring to the drawings.

First, physical evaluations of all of epoxy resin type compositions used in the present embodiments were respectively evaluated in the following manner.

(A) Evaluation of Foaming Magnification

A foaming material formed from the epoxy resin type composition was charged into a steel-plate panel structure with a sectional shape of 60 mm×50 mm and 400 mm length, then baked at 170° C.×20 minutes and the foaming magnification of the resulting foamed body was measured.

(B) Evaluation of Foaming Homogeneity

The test specimen in (A) above was evaluated visually for the homogeneity of foamed cells the rein. "OK" indicates a homogenous product and "NG" indicates a heterogeneous product.

(C) Rigidity Test

A cylindrical foaming material formed from the epoxy resin type composition was placed in the center of a steel-plate panel structure with a sectional shape of 60 mm×50 mm and 400 mm length, then baked at 170° C.×20 minutes, and evaluated for its rigidity after applying pressure P to the steel-plate panel structure 2 charged inside with the foamed body, as shown in FIG. 1. "OK" indicates a product with improved rigidity as compared with the uncharged member of the same weight, and "NG" indicates a product with the same or unimproved rigidity as compared with the uncharged member of the same weight.

(D) Evaluation of Storage Stability

A foaming material formed from the epoxy resin type composition was left at 40° C. for 5 days and baked at 170° C.×20 minutes, and the degree of change in the foaming magnification in the test (A) above was determined. "OK" indicates a product with unchanged foaming magnification, and "NG" indicates a product with lowered foaming magnification.

(E) Evaluation of Steel Plate Non-contact Properties

Figure 2A:
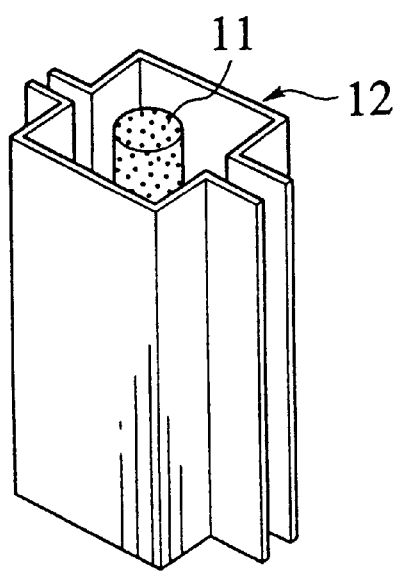
FIGS. 2A and 2B are drawings showing a steel plate non-contact test of a foamed body formed from an epoxy resin type composition of the present invention.
Figure 2B:
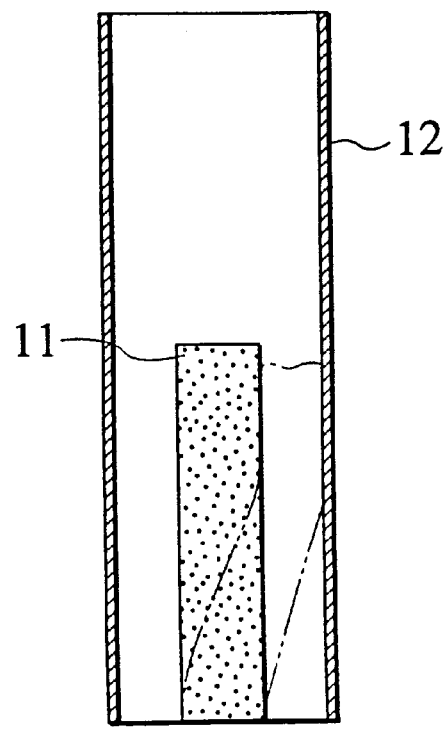

As shown in FIG. 2A, a foaming material 11 formed from the epoxy resin type composition, which had been extrusion-molded into a cylinder of 200 mm in length with a diameter capable of being foamed to fill the same steel-plate panel structure 12 as in test (C) above, was placed vertically so as not to contact with the steel-plate panel structure 2, and it was left at 40° C. for 5 days, and the contact state between the foaming material 11 and the steel-plate panel 12 was evaluated. As shown in FIG. 2B, "OK" indicates a product not contacting with the steel-plate panel structure 12, and "NG" indicates a product contacting with the steel-plate panel structure 12 due to its bending or falling.

Hereinafter, examples of epoxy resin type compositions in the embodiments of the present invention, including comparative examples, are described. As a matter of course, such examples are described as preferred typical examples and are not intended to limit the epoxy resin type composition of the present invention.

EXAMPLE 1

Methacrylate was emulsion-polymerized and formed into fine particles by spray-drying to give a granular polymer of 1 μm in diameter. The methacrylate type polymer obtained in this manner was blended in an amount of 5 parts by weight relative to 100 parts by weight of bisphenol A type epoxy resin of the formula (I) where in the formula (I) R is —C(CH$_3$)$_2$ and n is 1.2, and further 6 parts by weight of dicyandiamide as a hardening agent relative to 100 parts by weight of the bisphenol A type epoxy resin, 6 by weight of 4,4'-oxybenzene sulfonyl hydrazide as a foaming agent relative to 100 parts by weight of the bisphenol A type epoxy resin, and 130 parts by weight of calcium silicate as an inorganic filler (aspect ratio of 3:1) relative to 100 parts by weight of the bisphenol A type epoxy resin were blended therewith, and they were mixed at room temperature by means of a plastomill to prepare an epoxy resin type composition. This epoxy resin type composition was subjected to evaluation in items (A) to (E) above. As shown in the column in Example 1 in FIG. 3, its foaming magnification was 2.4, and its homogeneity, rigidity, storage stability, and steel plate non-contact properties were good.

EXAMPLE 2

Methacrylate was emulsion-polymerized and formed into fine particles by spray-drying to give a granular polymer of 1 μm in diameter. The methacrylate type polymer obtained in this manner was blended in an amount of 40 parts by weight relative to 100 parts by weight of bisphenol A type epoxy resin of the formula (I) where in the formula (I) R is —C(CH$_3$)$_2$ and n is 1.2, and further 6 parts by weight of dicyandiamide as a hardening agent relative to 100 parts by weight of the bisphenol A type epoxy resin, 6 parts by weight of 4,4'-oxybenzene sulfonyl hydrazide as a foaming agent relative to 100 parts by weight of the bisphenol A type epoxy resin, and 130 parts by weight of calcium silicate as an inorganic filler (aspect ratio 3:1) relative to 100 parts by weight of the bisphenol A type epoxy resin were blended therewith, and they were mixed at room temperature by means of a plastomill to prepare an epoxy resin type composition. This epoxy resin type composition was subjected to evaluation in items (A) to (E) above. As shown in the column in Example 2 in FIG. 3, its foaming magnification was 2.2, and its homogeneity, rigidity, storage stability, and steel plate non-contact properties were good.

EXAMPLE 3

Methacrylate was emulsion-polymerized and formed into fine particles by spray-drying to give a granular polymer of 1 μm in diameter. The methacrylate type polymer obtained in this manner was blended in an amount of 30 parts by weight relative to 100 parts by weight of bisphenol A type epoxy resin of the formula (I) where in the formula (I) R is —$C(CH_3)_2$ and n is 1.2, and further 3 parts by weight of dicyandiamide as a hardening agent relative to 100 parts by weight of the bisphenol A type epoxy resin, 6 part by weight of 4, 4'-oxybenzene sulfonyl hydrazide as a foaming agent relative to 100 parts by weight of the bisphenol A type epoxy resin, and 130 parts by weight of calcium silicate as an inorganic filler (aspect ratio 3:1) relative to 100 parts by weight of the bisphenol A type epoxy resin were blended therewith, and they were mixed at room temperature by means of a plastomill to prepare an epoxy resin type composition. This epoxy resin type composition was subjected to evaluation in items (A) to (E) above. As shown in the column in Example 3 in FIG. 3, its foaming magnification was 2.2, and its homogeneity, rigidity, storage stability, and steel plate non-contact properties were good.

EXAMPLE 4

Methacrylate was emulsion-polymerized and formed into fine particles by spray-drying to give a granular polymer of 1 μm in diameter. The methacrylate type polymer obtained in this manner was blended in an amount of 30 parts by weight relative to 100 parts by weight of bisphenol A type epoxy resin of the formula (I) where in the formula (I) R is —$C(CH_3)_2$ and n is 1.2, and further 15 parts by weight of dicyandiamide as a hardening agent relative to 100 parts by weight of the bisphenol A type epoxy resin, 6 part by weight of 4,4'-oxybenzene sulfonyl hydrazide as a foaming agent relative to 100 parts by weight of the bisphenol A type epoxy resin, and 130 parts by weight of calcium silicate as an inorganic filler (aspect ratio 3:1) relative to 100 parts by weight of the bisphenol A type epoxy resin were blended therewith, and they were mixed at room temperature by means of a plastomill to prepare an epoxy resin type composition. This epoxy resin type composition was subjected to evaluation in items (A) to (E) above. As shown in the column in Example 4 in FIG. 3, its foaming magnification was 2.1, and its homogeneity, rigidity, storage stability, and steel plate non-contact properties were good.

EXAMPLE 5

Methacrylate was emulsion-polymerized and formed into fine particles by spray-drying to give a granular polymer of 1 μm in diameter. The methacrylate type polymer obtained in this manner was blended in an amount of 30 parts by weight relative to 100 parts by weight of bisphenol A type epoxy resin of the formula (I) where in the formula (I) R is —$C(CH_3)_2$ and n is 1.2, and further 6 parts by weight of dicyandiamide as a hardening agent relative to 100 parts by weight of the bisphenol A type epoxy resin, 1 part by weight of 4,4'-oxybenzene sulfonyl hydrazide as a foaming agent relative to 100 parts by weight of the bisphenol A type epoxy resin, and 130 parts by weight of calcium silicate as an inorganic filler (aspect ratio 3:1) relative to 100 parts by weight of the bisphenol A type epoxy resin were blended therewith, and they were mixed at room temperature by means of a plastomill to prepare an epoxy resin type composition. This epoxy resin type composition was subjected to evaluation in items (A) to (E) above. As shown in the column in Example 5 in FIG. 3, its foaming magnification was 2.0, and its homogeneity, rigidity, storage stability, and steel plate non-contact properties were good.

EXAMPLE 6

Methacrylate was emulsion-polymerized and formed into fine particles by spray-drying to give a granular polymer of 1 μm in diameter. The methacrylate type polymer obtained in this manner was blended in an amount of 30 parts by weight relative to 100 parts by weight of bisphenol A type epoxy resin of the formula (I) where in the formula (I) R is —$C(CH_3)_2$ and n is 1.2, and further 6 parts by weight of dicyandiamide as a hardening agent relative to 100 parts by weight of the bisphenol A type epoxy resin, 15 parts by weight of 4,4'-oxybenzene sulfonyl hydrazide as a foaming agent relative to 100 parts by weight of the bisphenol A type epoxy resin, and 130 parts by weight of calcium silicate as an inorganic filler (aspect ratio 3:1) relative to 100 parts by weight of the bisphenol A type epoxy resin were blended therewith, and they were mixed at room temperature by means of a plastomill to prepare an epoxy resin type composition. This epoxy resin type composition was subjected to evaluation in items (A) to (E) above. As shown in the column in Example 6 in FIG. 3, its foaming magnification was 2.3, and its homogeneity, rigidity, storage stability, and steel plate non-contact properties were good.

EXAMPLE 7

Methacrylate was emulsion-polymerized and formed into fine particles by spray-drying to give a granular polymer of 1 μm in diameter. The methacrylate type polymer obtained in this manner was blended in an amount of 30 parts by weight relative to 100 parts by weight of bisphenol A type epoxy resin of the formula (I) where in the formula (I) R is —$C(CH_3)_2$ and n is 1.2, and further 6 parts by weight of dicyandiamide as a hardening agent relative to 100 parts by weight of the bisphenol A type epoxy resin, 6 parts by weight of 4,4'-oxybenzene sulfonyl hydrazide as a foaming agent relative to 100 parts by weight of the bisphenol A type epoxy resin, and 50 parts by weight of, calcium silicate as an inorganic filler (aspect ratio 3:1 relative to 100 parts by weight of the bisphenol A type epoxy resin were blended therewith, and they were mixed at room temperature by means of a plastomill to prepare an epoxy resin type composition. This epoxy resin type composition was subjected to evaluation in items (A) to (E) above. As shown in the column in Example 7 in FIG. 3, its foaming magnification was 3.2, and its homogeneity, rigidity, storage stability, and steel plate non-contact properties were good.

EXAMPLE 8

Methacrylate was emulsion-polymerized and formed into fine particles by spray-drying to give a granular polymer of 1 μm in diameter. The methacrylate type polymer obtained in this manner was blended in an amount of 30 parts by weight relative to 100 parts by weight of bisphenol A type epoxy resin of the formula (I) where in the formula (I) R is —$C(CH_3)_2$ and n is 1.2, and further 6 parts by weight of dicyandiamide as a hardening agent relative to 100 parts by weight of the bisphenol A type epoxy resin, 6 parts by weight of 4,4'-oxybenzene sulfonyl hydrazide as a foaming agent relative to 100 parts by weight of the bisphenol A type epoxy resin, and 180 parts by weight of calcium silicate as an inorganic filler (aspect ratio 3:1) relative to 100 parts by weight of the bisphenol A type epoxy resin were blended therewith, and they were mixed at room temperature by means of a plastomill to prepare an epoxy resin type composition. This epoxy resin type composition was subjected to evaluation in items (A) to (E) above. As shown in the column in Example 8 in FIG. 3, its foaming magnification was 2.8, and its homogeneity, rigidity, storage stability, and steel plate non-contact properties were good.

EXAMPLE 9

Methacrylate was emulsion-polymerized and formed into fine particles by spray-drying to give a granular polymer of 1 μm in diameter. The methacrylate type polymer obtained in this manner was blended in an amount of 30 parts by weight relative to 100 parts by weight of bisphenol A type epoxy resin of the formula (I) where in the formula (I) R is —$C(CH_3)_2$ and n is 1.2, and further 6 parts by weight of dicyandiamide as a hardening agent relative to 100 parts by weight of the bisphenol A type epoxy resin, 6 parts by weight of 4,4'-oxybenzene sulfonyl hydrazide as a foaming agent relative to 100 parts by weight of the bisphenol A type epoxy resin, 70 parts by weight of calcium silicate as an inorganic filler (aspect ratio 3:1) relative to 100 parts by weight of the bisphenol A type epoxy resin and 60 parts by weight of granular calcium carbonate as an inorganic filler relative to 100 parts by weight of the bisphenol A type epoxy resin were blended therewith, and they were mixed at room temperature by means of a plastomill to prepare an epoxy resin type composition. This epoxy resin type composition was subjected to evaluation in items (A) to (E) above. As shown in the column in Example 9 in FIG. 3, its foaming magnification was 2.4, and its homogeneity, rigidity, storage stability, and steel plate non-contact properties were good.

Comparative Example 1

Methacrylate was emulsion-polymerized and formed into fine particles by spray-drying to give a granular polymer of 1 μm in diameter. The methacrylate type polymer obtained in this manner was blended in an amount of 1 part by weight relative to 100 parts by weight of bisphenol A type epoxy resin of the formula (I) where in the formula (I) R is —$C(CH_3)_2$ and n is 1.2, and further 6 parts by weight of dicyandiamide as a hardening agent relative to 100 parts by weight of the bisphenol A type epoxy resin, 6 parts by weight of 4,4'-oxybenzene sulfonyl hydrazide as a foaming agent relative to 100 parts by weight of the bisphenol A type epoxy resin, and 130 parts by weight of calcium silicate as an inorganic filler (aspect ratio 3:1) relative to 100 parts by weight of the bisphenol A type epoxy resin were blended therewith, and they were mixed at room temperature by means of a plastomill to prepare an epoxy resin type composition. This epoxy resin type composition was subjected to evaluation in items (A) to (E) above. As shown in the column in Comparative Example 1 in FIG. 4, its foaming magnification was 3.5, and its rigidity and storage stability were good, but its foaming homogeneity and steel plate non-contact properties were not good.

Comparative Example 2

Methacrylate was emulsion-polymerized and formed into fine particles by spray-drying to give a granular polymer of 1 μm in diameter. The methacrylate type polymer obtained in this manner was blended in an amount of 50 parts by weight relative to 100 parts by weight of bisphenol A type epoxy resin of the formula (I) where in the formula (I) R is —$C(CH_3)_2$ and n is 1.2, and further 6 parts by weight of dicyandiamide as a hardening agent relative to 100 parts by weight of the bisphenol A type epoxy resin, 6 parts by weight of 4, 4'-oxybenzene sulfonyl hydrazide as a foaming agent relative to 100 parts by weight of the bisphenol A type epoxy resin, and 130 parts by weight of calcium silicate as an inorganic filler (aspect ratio 3:1) relative to 100 parts by weight of the bisphenol A type epoxy resin were blended therewith, and they were mixed at room temperature by means of a plastomill to prepare an epoxy resin type composition. This epoxy resin type composition was subjected to evaluation in items (A) to (E) above. As shown in the column in Comparative Example 2 in FIG. 4, its foaming magnification was 1.0 and not good.

Comparative Example 3

Methacrylate was emulsion-polymerized and formed into fine particles by spray-drying to give a granular polymer of 1 μm in diameter. The methacrylate type polymer obtained in this manner was blended in an amount of 30 parts by weight relative to 100 parts by weight of bisphenol A type epoxy resin of the formula (I) where in formula (I) R is —$C(CH_3)_2$ and n is 1.2, and further 0.5 part by weight of dicyandiamide as a hardening agent relative to 100 parts by weight of the bisphenol A type epoxy resin, 6 parts by weight of 4,4'-oxybenzene sulfonyl hydrazide as a foaming agent relative to 100 parts by weight of the bisphenol A type epoxy resin, and 130 parts by weight of calcium silicate as an inorganic filler (aspect ratio 3:1) relative to 100 parts by weight of the bisphenol A type epoxy resin were blended therewith, and they were mixed at room temperature by means of a plastomill to prepare an epoxy resin type composition. This epoxy resin type composition was subjected to evaluation in items (A) to (E) above. As shown in the column in Comparative Example 3 in FIG. 4, its foaming magnification was 3.6 and its storage ability and steel non-contact properties were good, but its foaming homogeneity was not good.

Comparative Example 4

Methacrylate was emulsion-polymerized and formed into fine particles by spray-drying to give a granular polymer of 1 μm in diameter. The methacrylate type polymer obtained in this manner was blended in an amount of 30 parts by weight relative to 100 parts by weight of bisphenol A type epoxy resin of the formula (I) where in the formula (I) R is —$C(CH_3)_2$ and n is 1.2, and further 25 parts by weight of dicyandiamide as a hardening agent relative to 100 parts by weight of the bisphenol A type epoxy resin, 6 parts by weight of 4,4'oxybenzene sulfonyl hydrazide as a foaming agent relative to 100 parts by weight of the bisphenol A type epoxy resin, and 130 parts by weight of calcium silicate as an inorganic filler (aspect ratio 3:1) relative to 100 parts by weight of the bisphenol A type epoxy resin were blended therewith, and they were mixed at room temperature by means of a plastomill to prepare an epoxy resin type composition. This epoxy resin type composition was subjected to evaluation in items (A) to (E) above. As shown in the column in Comparative Example 4 in FIG. 4, its foaming homogeneity was not good.

Comparative Example 5

Methacrylate was emulsion-polymerized and formed into fine particles by spray-drying to give a granular polymer of 1 μm in diameter. The methacrylate type polymer obtained in this manner was blended in an amount of 30 parts by weight relative to 100 parts by weight of bisphenol A type epoxy resin of the formula (I) where in the formula (I) R is —C(CH$_3$)$_2$ and n is 1.2, and further 6 parts by weight of dicyandiamide as a hardening agent relative to 100 parts by weight of the bisphenol A type epoxy resin, 0.1 part by weight of 4,4'-oxybenzene sulfonyl hydrazide as a foaming agent-relative to 100 parts by weight of the bisphenol A type epoxy resin, and 130 parts by weight of calcium silicate as an inorganic filler (aspect ratio 3:1) relative to 100 parts by weight of the bisphenol A type epoxy resin were blended therewith, and they were mixed at room temperature by means of a plastomill to prepare an epoxy resin type composition. This epoxy resin type composition was subjected to evaluation in items (A) to (E) above. As shown in the column in Comparative Example 5 in FIG. 4, its foaming magnification was 1.0 and not good.

Comparative Example 6

Methacrylate was emulsion-polymerized and formed into fine particles by spray-drying to give a granular polymer of 1 μm in diameter. The methacrylate type polymer obtained in this manner was blended in an amount of 30 parts by weight relative to 100 parts by weight of bisphenol A type epoxy resin of the formula (I) where in the formula (I) R is —C(CH$_3$)$_2$ and n is 1.2, and further 6 parts by weight of dicyandiamide as a hardening agent relative to 100 parts by weight of the bisphenol A type epoxy resin, 25 parts by weight of 4,4'-oxybenzene sulfonyl hydrazide as a foaming agent relative to 100 parts by weight of the bisphenol A type epoxy resin, and 130 parts by weight of calcium silicate as an inorganic filler (aspect ratio 3:1) relative to 100 parts by weight of the bisphenol A type epoxy resin were blended therewith, and they were mixed at room temperature by means of a plastomill to prepare an epoxy resin type composition. This epoxy resin type composition was subjected to evaluation in items (A) to (E) above. As shown in the column in Comparative Example 6 in FIG. 4, its foaming magnification was 2.2, and its foaming homogeneity, rigidity, storage stability, and steel plate non-contact properties were good, but although a large amount of the foaming agent was blended, its foaming magnification did not so change, indicating a relatively small economical advantage.

Comparative Example 7

Methacrylate was emulsion-polymerized and formed into fine particles by spray-drying to give a granular polymer of 1 μm in diameter. The methacrylate type polymer obtained in this manner was blended in an amount of 30 parts by weight relative to 100 parts by weight of bisphenol A type epoxy resin of the formula (I) where in the formula (I) R is —C(CH$_3$)$_2$ and n is 1.2, and further 6 parts by weight of dicyandiamide as a hardening agent relative to 100 parts by weight of the bisphenol A type epoxy resin, 6 parts by weight of 4,4'-oxybenzene sulfonyl hydrazide as a foaming agent relative to 100 parts by weight of the bisphenol A type epoxy resin, and 30 parts by weight of calcium silicate as an inorganic filler (aspect ratio 3:1) relative to 100 parts by weight of the bisphenol A type epoxy resin were blended therewith, and they were mixed at room temperature by means of a plastomill to prepare an epoxy resin type composition. This epoxy resin type composition was subjected to evaluation in items (A) to (E) above. As shown in the column in Comparative Example 7 in FIG. 4, its foaming magnification was as high as 3.8, but its foaming homogeneity and steel plate non-contact properties were not good.

Comparative Example 8

Methacrylate was emulsion-polymerized and formed into fine particles by spray-drying to give a granular polymer of 1 μm in diameter. The methacrylate type polymer obtained in this manner was blended in an amount of 30 parts by weight relative to 100 parts by weight of bisphenol A type epoxy resin of the formula (I) where in the formula (I) R is —C(CH$_3$)$_2$ and n is 1.2, and further 6 parts by weight of dicyandiamide as a hardening agent relative to 100 parts by weight of the bisphenol A type epoxy resin, 6 parts by weight of 4,4'-oxybenzene sulfonyl hydrazide as a foaming agent relative to 100 parts by weight of the bisphenol A type epoxy resin, and 250 parts by weight of calcium silicate as an inorganic filler (aspect ratio 3:1) relative to 100 parts by weight of the bisphenol A type epoxy resin were blended therewith, and they were mixed at room temperature by means of a plastomill to prepare an epoxy resin type composition. This epoxy resin type composition was subjected to evaluation in items (A) to (E) above. As shown in the column in Comparative Example 8 in FIG. 4, its foaming magnification was as low as 1.2, and its foaming homogeneity and rigidity were not good.

Comparative Example 9

Methacrylate was emulsion-polymerized and formed into fine particles by spray-drying to give a granular polymer of 1 μm in diameter. The methacrylate type polymer obtained in this manner was blended in an amount of 30 parts by weight relative to 100 parts by weight of bisphenol A type epoxy resin of the formula (I) where in the formula (I) R is —C(CH$_3$)$_2$ and n is 1.2, and further 6 parts by weight of dicyandiamide as a hardening agent relative to 100 parts by weight of the bisphenol A type epoxy resin, 6 parts by weight of 4,4'-oxybenzene sulfonyl hydrazide as a foaming agent relative to 100 parts by weight of the bisphenol A type epoxy resin, 30 parts by weight of calcium silicate as inorganic filler (aspect ratio 3:1) relative to 100 parts by weight of the bisphenol A type epoxy resin and 100 parts by weight of granular calcium carbonate as an inorganic filler relative to 100 parts by weight of the bisphenol A type epoxy resin were blended therewith, and they were mixed at room temperature by means of a plastomill to prepare an epoxy resin type composition. This epoxy resin type composition was subjected to evaluation in items (A) to (E) above. As shown in the column in Comparative Example 9 in FIG. 4, its foaming homogeneity was not good.

Then, the method for stiffening a vehicle body in the embodiments of the present invention is described with reference to sectional drawings 5A to 5E.

Figure 5A:
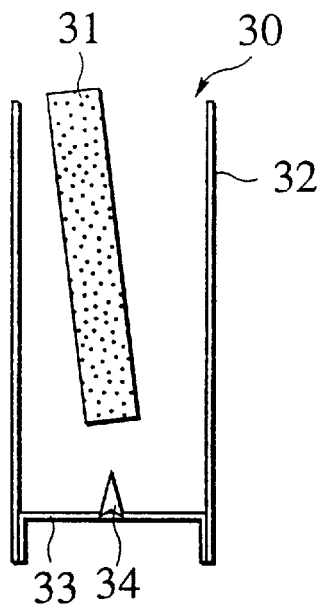
FIGS. 5A to 5E are drawings showing the method for stiffening a vehicle body in an embodiment of the present invention.

First, in FIG. 5A, a foaming material 31 obtained by forming the epoxy resin type composition of the present invention into a solid tube is carried to the inside of a box type constitutional member 30 of a vehicle body. During this carriage, while the side of the foaming material 31 is opposed to a panel 32 constituting the box type constitutional member 30, the edge face at the short side of the foaming material 31 is directed to a bracket 33 provided with a wedge member 34.

Figure 5B:
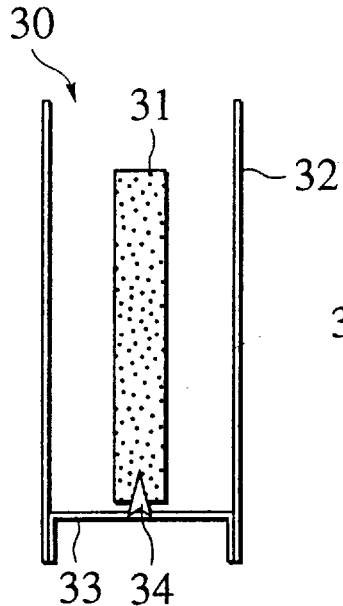

Then, in FIG. 5B, the edge face of the foaming member 31 is fixed to the wedge member 34 while the side of foaming material 31 is separated from panel 32.

Figure 5C:
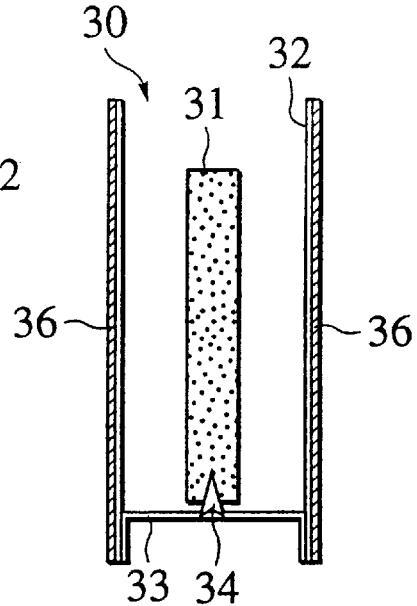

Then, in the step of coating the vehicle body with an anti-corrosive coating as shown in FIG. 5C, an anti-corrosive coating paint film 36 is formed by electrodeposition, that is, electrostatic coating in this embodiment. In FIG. 3C, the anti-corrosive coating paint film 36 is shown in only the outside of the box type constitutional member 30, but has been formed in the inside as well. Then, the anti-corrosive coating paint film 36 is sufficiently hardened in this state.

Figure 5D:
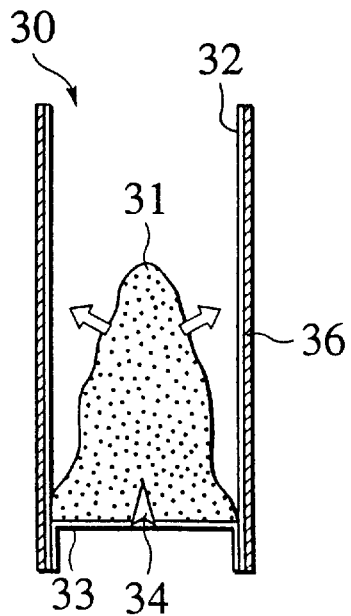

Then, in the step of baking the anti-corrosive coating paint on the vehicle body shown in FIG. 5D, the heat in the baking step is utilized to initiate foaming of the foaming material 31.

Figure 5E:
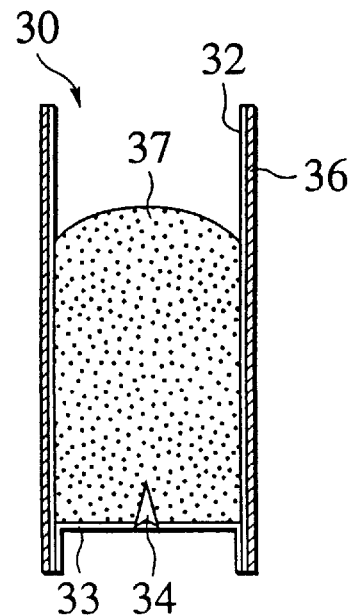

Then, as shown in FIG. 5E, the foaming material is converted into a foamed body 37, and the foamed body 37

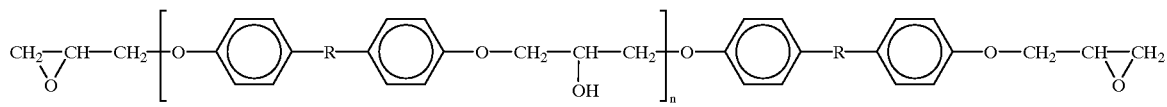

is allowed to fill the whole of the necessary part inside of the box type structural member 30.

By this method, adequate improvements in rigidity of the box type structural member 30 are realized without deteriorating the anti-corrosive coating paint film 36.

Figure 6A:
FIGS. 6A and 6B are drawings showing the method for stiffening a vehicle body in another embodiment of the present invention.
Figure 6B:
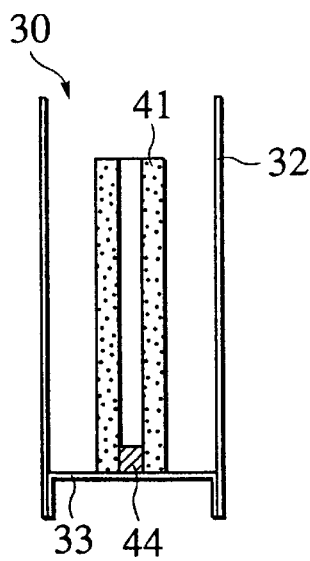

FIGS. 6A and 6B show a method for stiffening a vehicle body in an another embodiment of the present invention. In this embodiment, the major difference from FIGS. 5A to 5E is that a hollow tubular foaming material 41 was used. FIG. 6A is a top view of the foaming material 41 in FIG. 6B.

In such an embodiment, a pin 44 is provided on the bracket 33, and the pin 44 is fitted into the hollow part of the foaming material 41 thereby fixing the foaming material 41.

In such an embodiment, therefore, fixation of the foaming material 41 to the box type structural member 30 is further assured.

Figure 7A:
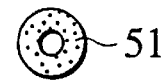
FIGS. 7A and 7B are drawings showing the method for stiffening a vehicle body in another embodiment of the present invention.
Figure 7B:
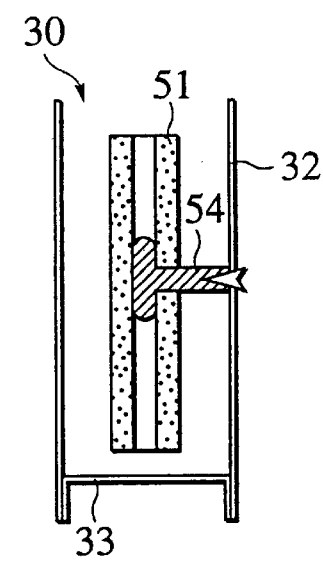

Finally, FIGS. 7A and 7B also show a method for stiffening a vehicle body in another embodiment of the present invention. In this embodiment, the major differences from FIGS. 5A to 5E are that a hollow tubular foaming material 51 was used and the manner of fixing it to the box type structural member 30 was changed. FIG. 7A is a top view of the foaming material 51 in FIG. 7B.

In such an embodiment, the panel 32 in the box type structural member 30 is provided with a T-shaped holder member 54, and this T-shaped portion of the holder member 54 is fitted into the hollow part of the foaming material 51 thereby fixing the foaming material 51.

Accordingly, in such an embodiment, the edge face at the short side of the foaming material 51 can be completely separated from the bracket 33 so that the possibility of deterioration of the anti-corrosive coating film is further lowered.

What is claimed is:

1. An epoxy resin type composition for stiffening a vehicle body, comprising:
    epoxy resin;
    a powdery methacrylate type polymer in an amount of 2 to 45 parts by weight relative to 100 parts by weight of said epoxy resin;
    a thermally active hardening agent for epoxy resin in an amount of 1 to 20 parts by weight relative to 100 parts by weight of said epoxy resin;
    a thermally decomposable organic type foaming agent in an amount of 0.5 to 20 parts by weight relative to 100 parts by weight of said epoxy resin; and
    a mixture of an inorganic salt with a shape of a predetermined aspect ratio and a granular inorganic salt, said mixture being in an amount of 50 to 200 parts by weight relative to 100 parts by weight of said epoxy resin wherein a mixing ratio of said granular inorganic salt is 0 to 50% by weight relative to a total amount of said mixture.

2. An epoxy resin type composition for stiffening a vehicle body according to claim 1, wherein said epoxy resin is a bisphenol type epoxy resin represented by the following formula:

wherein n is 1.0 or more on average.

3. An epoxy resin type composition for stiffening a vehicle body according to claim 1, wherein a glass transition point of said powdery methacrylate type polymer is 70° C. or more.

4. An epoxy resin type composition for stiffening a vehicle body according to claim 1, wherein said thermally active hardening agent for epoxy resin reacts at 140° C. or more.

5. An epoxy resin type composition for stiffening a vehicle body according to claim 1, wherein a temperature for initiating thermal decomposition of said thermally decomposable organic type foaming agent is 140° C. or more.

6. An epoxy resin type composition for stiffening a vehicle body according to claim 1, wherein a shape of said inorganic salt with a predetermined aspect ratio includes needle like shape, tube like shape and/or plate like shape and said predetermined aspect ratio is 2:1 or more.

7. A method for stiffening a vehicle body, comprising the steps of:
    providing a foaming material having been formed into a solid tube containing an epoxy resin type composition;
    arranging said foaming material in an inside of a box type structural member of said vehicle body such that a tubular side of said foaming material is separated from a constitutional panel constituting said box type structural member of said vehicle body; and
    permitting said foaming material arranged in said inside of said box type structural member of said vehicle body to be foamed by baking of a coating on said vehicle body such that said foaming material becomes foamed body thereby filling said inside of said box type structural member of said vehicle body, wherein said epoxy resin type composition comprises:
    epoxy resin;
    a powdery methacrylate type polymer in an amount of 2 to 45 parts by weight relative to 100 parts by weight of said epoxy resin;
    a thermally active hardening agent for epoxy resin in an amount of 1 to 20 parts by weight relative to 100 parts by weight of said epoxy resin;
    a thermally decomposable organic type foaming agent in an amount of 0.5 to 20 parts by weight relative to 100 parts by weight of said epoxy resin; and
    a mixture of an inorganic salt with a shape of a predetermined aspect ratio and a granular inorganic salt, said mixture being in an amount of 50 to 200 parts by weight relative to 100 parts by weight of said epoxy resin wherein a mixing ratio of said granular inorganic salt is 0 to 50% by weight relative to a total amount of said mixture.

8. A method for stiffening a vehicle body, comprising the steps of:
providing a foaming material having been formed into a hollow tube containing an epoxy resin type composition;
arranging said foaming material in an inside of a box type structural member of said vehicle body such that a tubular side of said foaming material is separated from a constitutional panel constituting said box type structural member of said vehicle body; and
permitting said foaming material arranged in said inside of said box type structural member of said vehicle body to be foamed by baking of a coating on said vehicle body such that said foaming material becomes foamed body thereby filling said inside of said box type structural member of said vehicle body, wherein said epoxy resin type composition comprises:
epoxy resin;
a powdery methacrylate type polymer in an amount of 2 to 45 parts by weight relative to 100 parts by weight of said epoxy resin;
a thermally active hardening agent for epoxy resin in an amount of 1 to 20 parts by weight relative to 100 parts by weight of said epoxy resin;
a thermally decomposable organic type foaming agent in an amount of 0.5 to 20 parts by weight relative to 100 parts by weight of said epoxy resin; and
a mixture of an inorganic salt with a shape of a predetermined aspect ratio and a granular inorganic salt, said mixture being in an amount of 50 to 200 parts by weight relative to 100 parts by weight of said epoxy resin wherein a mixing ratio of said granular inorganic salt is 0 to 50% by weight relative to a total amount of said mixture.

9. A method for stiffening a vehicle body according to claim 7, wherein, after a coating used in said coating step is solidified, said foaming material is allowed as said foamed body to fill substantially the whole of said inside of said box type structural member of said vehicle body.

10. A method for stiffening a vehicle body according to claim 9, wherein said coating is an anti-corrosive coating by electrodeposition.

11. A method for stiffening a vehicle body according to claim 8, wherein, after a coating used in said coating step is solidified, said foaming material is allowed as said foamed body to fill substantially the whole of said inside of said box type structural member of said vehicle body.

12. A method for stiffening a vehicle body according to claim 11, wherein said coating is an anti-corrosive coating by electrodeposition.

13. An epoxy resin composition according to claim 1, wherein said powdery methacrylate polymer is formed from a methacrylate monomer having a C1 to C4 alkyl group.

14. An epoxy resin composition according to claim 12, wherein said powdery methacrylate polymer is formed from methylmethacrylate.

15. An epoxy resin composition according to claim 1, wherein said powdery methacrylate polymer is a copolymer of a methacrylate monomer having a C1 to C4 alkyl group with a copolymerizable monomer selected from the group consisting of styrene, vinyltoluene, α-methylstyrene, acrylonitrile, methyacrylonitrile, vinylidene cyanide, 2-hydroxyethylacrylate, 2-hydroxyethyl methacrylate, 3-hydroxybutyl acrylate, 2-hydroxyethyl fumarate, hydroxybutyl vinyl ether, monobutyl maleate, glycidyl ethacrylate, butoxyethyl methacrylate, and mixture thereof.

16. A method according to claim 7, wherein said powdery methacrylate polymer is formed from a methacrylate having a C1 to C4 alkyl group.

17. A method according to claim 7, wherein said powdery methacrylate polymer is formed from methacrylate.

18. A method according to claim 7, wherein said powdery methacrylate polymer is a copolymer of a methacrylate monomer having a C1 to C4 alkyl group with a copolymerizable monomer selected from the group consisting of styrene, vinyltoluene, α-methylstyrene, acrylonitrile, methyacrylonitrile, vinylidene cyanide, 2-hydroxyethylacrylate, 2-hydroxyethyl methacrylate, 3-hydroxybutyl acrylate, 2-hydroxyethyl fumarate, hydroxybutyl vinyl ether, monobutyl maleate, glycidyl ethacrylate, butoxyethyl methacrylate, and mixtures thereof.

* * * * *